(No Model.)
F. F. FOULK.
NUT LOCK.
No. 354,696. Patented Dec. 21, 1886.
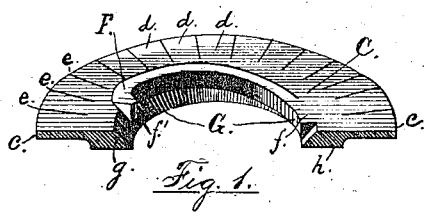
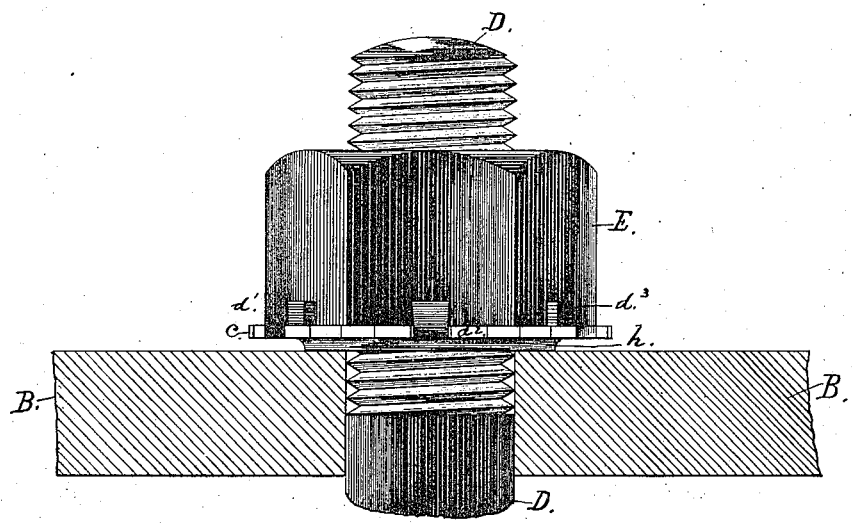
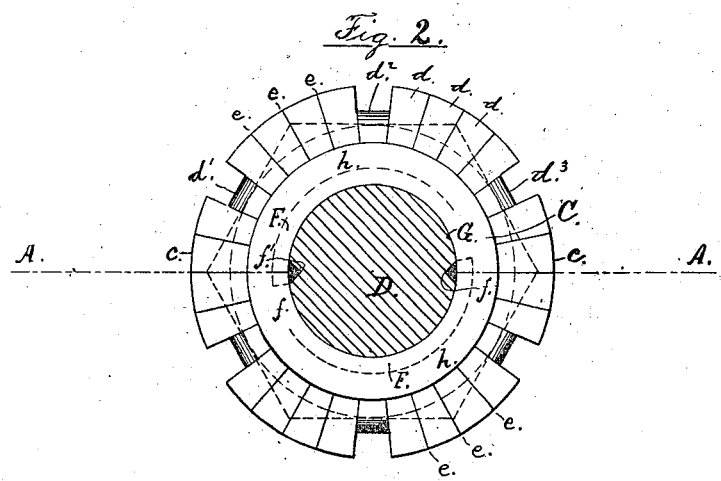
WITNESSES:
Wm. J. Mingle
W. A. Halbach.
INVENTOR
Frank F. Foulk
By D. H. Kouper & Co.
ATTORNEYS

UNITED STATES PATENT OFFICE.

FRANK F. FOULK, OF WEST EARL, PENNSYLVANIA.

NUT-LOCK.

SPECIFICATION forming part of Letters Patent No. 354,696, dated December 21, 1886.

Application filed November 3, 1886. Serial No. 217,863. (No model.)

*To all whom it may concern:*

Be it known that I, FRANK F. FOULK, of West Earl, in the county of Lancaster and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locking devices in which a washer of peculiar construction is used to prevent the nut from turning on the bolt.

This invention consists, partly, in the construction of a circular washer, the hole through which is of a size to pass over the bolt. Fast on opposite sides of this hole are the ends of semicircular spring-tongues, on the loose ends of which are projecting points, which are pressed into the threads of the bolt, preventing the washer from turning, in a manner hereinafter described.

This invention further consists in bisecting the outer edge of the flange of this washer into a number of lugs by cuts extending a distance in from the periphery and radial with the center. I attain these objects by the mechanism illustrated in the accompanying drawings, similar letters referring to similar parts throughout the several views.

Figure 1 represents a longitudinal perspective sectional view of the locking-washer, through the lines A A of Fig. 3, fully showing one of the semicircular tongues; Fig. 2, a full side elevation showing the nut, bolt, and washer; Fig. 3, a plan view of Fig. 2, with the plate B removed.

In the perspective sectional view, Fig. 1, the construction of the washer C is shown, the outer edge of the flange $c$ being bisected into a number of lugs, $d\ d\ d$, by the cuts $e\ e\ e$. These cuts project in a distance from the outer periphery of the flange and radially toward the center. The inside opening, G, of the washer where it fits the bolt D is cone or funnel shaped, the taper being shown in cross-section at $g$, the large end of this section of a concave cone being at the upper side of the washer and facing the nut E. Fast on opposite sides of this cone-shaped opening are semicircular spring-tongues, one of which is shown at F. The outside of these tongues is of the same angle as the cone of the washer, and one end is fastened rigidly to the body of said washer at $f$. This fastening may be done by riveting or brazing; or the tongue may be punched from the solid metal of the body C, and on the inside edge of the other end, which is allowed to spring up above the face of the same, are V-shaped projections $f'$, which are intended to be pressed into the thread of the bolt D by the nut E, in a manner hereinafter described, Fig. 1 showing one half of the washer only. It is understood the other half is similar.

Having described the construction of this washer, the application of the same is as follows: The bolt D being in position through the work or plate B, the washer C is slipped onto the same, the spring-tongues being on the upper side, the V-shaped projection pressing against the thread of the bolt D on each side of the same. The nut E is now screwed down on the bolt D. When it comes in contact with the upwardly-projecting ends of the spring-tongues F, they are forced down in the washer C; the opening in which being cone-shaped, and the outside of the tongues conforming to the same, the action of the nut in forcing their semicircular convex faces into the concave cone of the washer drives the V-shaped projections $f$ on their outer ends into the thread of the bolt D, as seen at $f'\ f'$ in Fig. 3, which prevents the washer C from turning on bolt D, by a number of the lugs $d\ d\ d$ of the flange of the washer, which are bent up against its sides, as shown at $d'\ d^2\ d^3$ in Fig. 2.

In the drawings the washer C is shown with a boss, $h_o$ on its under side, which makes said washer thicker around the central opening than the outer flange, $c$. The idea of this feature is to allow a tool to be more easily entered under the lugs $d\ d\ d$ when it is desired to bend them up against the sides of the nut E, though to facilitate manufacture the washer may be made from flat plate of the required thickness.

Having thus described my invention, what I claim as new, and desire to secure by Letters Patent, is—

In a nut-locking device, the combination, in a washer, of the following elements: the body C and the lugs $d\ d\ d$, constituting the flange $c$, which may be turned up against the side of the nut E to prevent the same from turning, the central cone-shaped opening, G, and semicircular spring-tongues F, which are fast on opposite sides of the opening G, and the points $f'$ on the inner face of the upwardly-projecting ends of the tongues F, which are forced into the thread of the bolt D to prevent the washer turning, when constructed and applied substantially as herein shown, and for the purpose set forth and described.

In testimony whereof I have hereunto subscribed my name in the presence of two subscribing witnesses.

FRANK F. FOULK.

Witnesses:
 A. F. SHENCK,
 J. S. BITNER.